United States Patent
Dunn et al.

(10) Patent No.: US 10,804,699 B1
(45) Date of Patent: Oct. 13, 2020

(54) POWER PRODUCTION MONITORING OR CONTROL

(71) Applicant: Vivint, Inc., Provo, UT (US)

(72) Inventors: Alex J. Dunn, Orem, UT (US);
Brendon A. Merkley, Poster City, CA (US); Tanguy Serra, San Francisco, CA (US); James E. Nye, Alpine, UT (US); Jeremy B. Warren, Draper, UT (US)

(73) Assignee: Vivint, Inc., Provo, UT (US)

( * ) Notice: Subject to any disclaimer, the term of this patent is extended or adjusted under 35 U.S.C. 154(b) by 16 days.

(21) Appl. No.: 15/670,549

(22) Filed: Aug. 7, 2017

Related U.S. Application Data

(63) Continuation of application No. 14/211,460, filed on Mar. 14, 2014, now Pat. No. 9,728,964.

(60) Provisional application No. 61/786,517, filed on Mar. 15, 2013.

(51) Int. Cl.
*H02J 3/14* (2006.01)
*H02J 3/38* (2006.01)
*G08B 25/08* (2006.01)

(52) U.S. Cl.
CPC .............. *H02J 3/14* (2013.01); *G08B 25/08* (2013.01); *H02J 3/383* (2013.01); *H02J 2310/14* (2020.01)

(58) Field of Classification Search
CPC ........ H02J 3/14; H02J 3/383; H02J 2003/143; G08B 25/08
See application file for complete search history.

(56) References Cited

U.S. PATENT DOCUMENTS

| | | |
|---|---|---|
| 7,130,719 B2 | 10/2006 | Ehlers et al. |
| 8,103,465 B2 | 1/2012 | Brzezowski et al. |
| 8,138,630 B2 | 3/2012 | Dibachi et al. |
| 8,190,385 B2 | 5/2012 | Rowe et al. |
| 8,242,634 B2 | 8/2012 | Schatz et al. |
| 8,352,091 B2 * | 1/2013 | Haugh ............... G06F 1/26 307/150 |
| 8,473,250 B2 * | 6/2013 | Adest ............... G01D 4/004 702/182 |
| 8,725,437 B2 | 5/2014 | Caine |
| 8,816,870 B2 | 8/2014 | Plaisted et al. |
| 8,872,379 B2 | 10/2014 | Ruiz et al. |
| 8,880,229 B2 | 11/2014 | Lee |
| 8,884,463 B2 | 11/2014 | Dibachi et al. |
| 9,002,531 B2 | 4/2015 | Mansfield |
| 9,020,769 B2 | 4/2015 | Rada et al. |
| 9,178,356 B2 | 11/2015 | Bryson |
| 9,236,762 B2 | 1/2016 | John et al. |
| 2007/0010916 A1 * | 1/2007 | Rodgers ............... H02J 3/14 700/295 |
| 2008/0046387 A1 | 2/2008 | Gopal et al. |
| 2008/0147335 A1 * | 6/2008 | Adest ............... G01D 4/004 702/64 |
| 2009/0088991 A1 | 4/2009 | Brzezowski et al. |

(Continued)

*Primary Examiner* — Charles R Kasenge
(74) *Attorney, Agent, or Firm* — Holland & Hart, LLP

(57) ABSTRACT

The present invention is directed to monitoring or control of power production. A power production monitoring system may include a power production monitoring panel that is also configured to operate a premises control system. The power production monitoring system may include a gateway unit that receives signals from a power production source and sends signals to a power production monitoring panel.

18 Claims, 7 Drawing Sheets

(56) References Cited

U.S. PATENT DOCUMENTS

| | | | |
|---|---|---|---|
| 2009/0157545 A1* | 6/2009 | Mobley | G06Q 20/102 705/40 |
| 2009/0267632 A1 | 10/2009 | Rowe et al. | |
| 2010/0023337 A1* | 1/2010 | Case | G06Q 30/00 705/1.1 |
| 2010/0043319 A1* | 2/2010 | Bennett | E04D 1/30 52/173.3 |
| 2010/0106339 A1 | 4/2010 | Little et al. | |
| 2010/0174418 A1* | 7/2010 | Haugh | G06F 1/26 700/295 |
| 2010/0207448 A1* | 8/2010 | Cooper | H02J 3/14 307/20 |
| 2010/0207951 A1 | 8/2010 | Plaisted et al. | |
| 2010/0245103 A1 | 9/2010 | Plaisted et al. | |
| 2010/0293045 A1* | 11/2010 | Burns | G06Q 30/0208 705/14.11 |
| 2010/0308765 A1* | 12/2010 | Moore | H02J 7/0013 320/103 |
| 2011/0066401 A1 | 3/2011 | Yang et al. | |
| 2011/0068624 A1 | 3/2011 | Dibachi et al. | |
| 2011/0090089 A1 | 4/2011 | Luo | |
| 2011/0130982 A1 | 6/2011 | Haag et al. | |
| 2011/0133688 A1* | 6/2011 | Ishibashi | H01M 10/425 320/101 |
| 2011/0204720 A1 | 8/2011 | Ruiz et al. | |
| 2011/0251807 A1 | 10/2011 | Rada et al. | |
| 2011/0257795 A1 | 10/2011 | Narayanamurthy et al. | |
| 2011/0282601 A1* | 11/2011 | Hoff | G01W 1/12 702/60 |
| 2012/0048328 A1 | 3/2012 | Solon | |
| 2012/0054125 A1 | 3/2012 | Clifton et al. | |
| 2012/0083938 A1 | 4/2012 | Takagi et al. | |
| 2012/0086386 A1 | 4/2012 | Dibachi et al. | |
| 2012/0095813 A1* | 4/2012 | Case | G06Q 30/0207 705/14.1 |
| 2012/0173034 A1* | 7/2012 | Taima | B60L 3/12 700/295 |
| 2012/0215372 A1 | 8/2012 | Kernahan et al. | |
| 2012/0233060 A1* | 9/2012 | Terano | G06Q 30/06 705/37 |
| 2012/0316808 A1 | 12/2012 | Frader-Thomson et al. | |
| 2013/0009486 A1 | 1/2013 | Morimoto | |
| 2013/0036042 A1* | 2/2013 | Mobley | G06Q 20/102 705/38 |
| 2013/0046412 A1 | 2/2013 | Chan et al. | |
| 2013/0049695 A1* | 2/2013 | Baba | H02J 3/32 320/128 |
| 2013/0082724 A1 | 4/2013 | Noda et al. | |
| 2013/0162650 A1* | 6/2013 | Marivoet | H02J 3/14 345/440 |
| 2013/0249297 A1 | 9/2013 | Takehara et al. | |
| 2014/0046873 A1* | 2/2014 | Mobley | G06Q 20/102 705/412 |
| 2014/0060100 A1 | 3/2014 | Bryson | |
| 2014/0062191 A1 | 3/2014 | Bryson | |
| 2014/0062206 A1 | 3/2014 | Bryson | |
| 2014/0094979 A1 | 4/2014 | Mansfield | |
| 2015/0207319 A1* | 7/2015 | Miller | G06Q 50/06 700/291 |

\* cited by examiner

POWER PRODUCTION MONITORING OR CONTROL

This application is a continuation application of U.S. patent application Ser. No. 14/211,460 entitled "POWER PRODUCTION MONITORING OR CONTROL," which was filed Mar. 14, 2014, which claims priority from U.S. Provisional Patent Application No. 61/786,517 entitled "POWER PRODUCTION MONITORING OR CONTROL," which was filed Mar. 15, 2013.

BACKGROUND

Homes or other structures or property, e.g., businesses or lands, can generate electricity with solar, wind, or other renewable or non-renewable energy sources located on the premises or nearby, e.g., locally, as an alternative to or in addition to purchasing electric power from the public grid or utility. In some circumstances, electricity generated locally runs through a net meter which tracks the net power consumption on the demand side of the meter, e.g., used by the home or business associated with the meter. If power generated locally exceeds local demand, power can be fed from the local source back to the public grid, subtracting from the net usage by the home or business. Various statutory and/or contractual arrangements exist for homeowners or businesses, e.g., local power users (referred to generally herein as "homeowner"), to receive a form of compensation for power generated locally and supplied to the public grid.

Systems for monitoring and controlling of local power generation allow a local user to track local power usage or generation. Known systems for monitoring and control of power generation have various limitations and disadvantages.

SUMMARY

In a specific embodiment, a security system or home automation system may be used in conjunction with a power production system. A security system that may be used in conjunction with a power production system may comprise a security system for a home or other building at which equipment for generating solar power is used. An automation system that is useful with the power production system may comprise a system that automates the premises (e.g., building, a building space, etc.) with which the solar power generation equipment is used. The power production system may include a power production source comprising one or more solar panels, one or more of the solar panels being coupled to one or more inverters, wherein the power production source is configured to supply power to an electrical system. The combination of a security system or an automation system with a power production system may be referred to herein as a "premises control and power production system." The premises control and power production system may further include a gateway unit in communication with the power production source and configured to obtain information regarding power production by the power production source. The premises control and power production system may further include a security system comprising a plurality of peripheral devices (e.g., security sensors, etc.) that can communicate with a control unit of the security system and the gateway unit, or an automation system comprising a plurality of peripheral devices (e.g., controlled devices, sensors, etc.), a control unit with which the peripheral devices of the automation system are configured to communicate and the gateway unit, the control unit of either type of system being configured to display a status of the security system and information regarding power production by the power production source.

In another specific embodiment, a premises control and power production system may include a control unit wirelessly coupled to a plurality of peripheral devices and a gateway unit. The premises control and power production system may further include a power production source in communication with the gateway unit.

In yet another specific embodiment, a control unit may include a housing, a display disposed within the housing and viewable from without the housing, a processor disposed within the housing, and a memory module disposed within the housing, wherein the control unit is configured to receive signals from one or more peripheral devices and a power production source.

In another specific embodiment, a power production monitoring system may include a gateway unit configured to accept information from a power production source. The power production monitoring system may further include a control unit configured to communicate with the gateway unit and display information relating to power production by the power production source.

In yet another specific embodiment, a premises control and power production system may include a control unit configurable to receive a first set of information relating to power production by a power production source and a second set of information relating to a status of a security system or an automation system.

Of course, methods of operating a system are also within the scope of the present invention. The disclosure also includes methods of using and methods of manufacture of the systems and/or various components or combinations of components described above or elsewhere herein. Such a method may include a method of monitoring solar power production on a residential lot. The method may include retrieving information from a power production source located on the residential lot, retrieving information from one or more peripheral devices located on the residential lot, and displaying information relating to one or both of the power production source or the peripheral devices.

Yet another embodiment of the present invention comprises a computer readable media storage storing instructions that when executed by a processor cause the processor to perform instructions in accordance with one or more embodiments described herein. Such instructions can include retrieving information from a power production source located on the residential lot, retrieving information from one or more peripheral devices located on the residential lot, and displaying information relating to one or both of the power production source or the peripheral devices.

Other aspects, as well as features and advantages of various aspects, of the present invention will become apparent to those of skill in the art though consideration of the ensuing description, the accompanying drawings and the appended claims.

DETAILED DESCRIPTION

Figure 1:
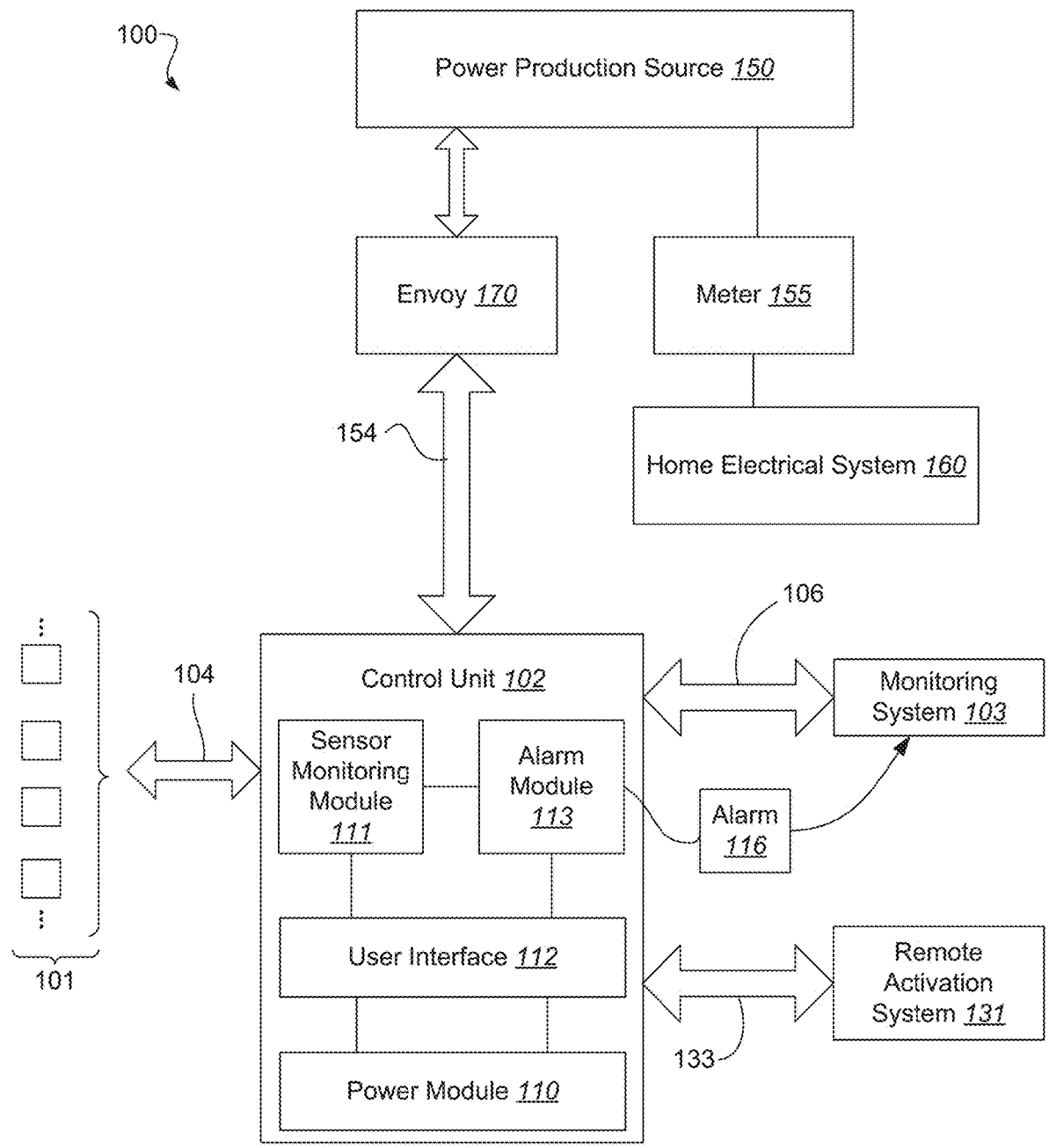
FIG. 1 illustrates an embodiment of a local premises control and power generation system.

Referring in general to the accompanying drawings, various embodiments of the present invention are illustrated to show the structure and methods for monitoring or controlling local power generation or monitoring or controlling interaction of a local power system with a public utility grid. Common elements of the illustrated embodiments are designated with like numerals. It should be understood that the figures presented are not meant to be illustrative of actual views of any particular portion of the actual device structure, but are merely schematic representations which are employed to more clearly and fully depict embodiments of the invention.

The following provides a more detailed description of the present invention and various representative embodiments thereof. In this description, functions may be shown in block diagram form in order not to obscure the present invention in unnecessary detail. Additionally, block definitions and partitioning of logic between various blocks is exemplary of a specific implementation. It will be readily apparent to one of ordinary skill in the art that the present invention may be practiced by numerous other partitioning solutions. For the most part, details concerning timing considerations and the like have been omitted where such details are not necessary to obtain a complete understanding of the present invention and are within the abilities of persons of ordinary skill in the relevant art.

In this description, some drawings may illustrate signals as a single signal for clarity of presentation and description. It will be understood by a person of ordinary skill in the art that the signal may represent a bus of signals, wherein the bus may have a variety of bit widths and the present invention may be implemented on any number of data signals including a single data signal.

According to various embodiments of the present disclosure, a local power generation system may include a local power source, a power meter, a gateway unit, and a control panel. For example, in one embodiment, a power source may include one or more solar panels or photovoltaic cells. The power source may also include wind or other renewable or non-renewable power generation methods. In some embodiments, electricity produced by the power source may be connected to one or more power inverters that can convert direct current (DC) to alternating current (AC) or vice versa. In some embodiments, power produced by the power source is connected to one or more energy meters or the electrical system of a home, business, or other energy-consuming entity, referred to generally herein as the home. In some embodiments, a gateway unit is in communication with one or more of the local power source, power meter, or control panel. Such communication may be direct or indirect and may be accomplished by, for example, direct electrical connection, power line communication (PLC) using existing electrical wiring (e.g., home electrical system), wireless transmission, Ethernet, or any other wired or wireless communication method.

In accordance with various embodiments of the present disclosure, a control panel may receive information from one or more of the local power source, power meter, or gateway unit. For example, in one embodiment, a gateway unit receives data or information regarding electricity production from the local power source or power meter connected to the local power source. The control panel then receives the data or information from the gateway unit. In some embodiments, the gateway unit is physically contained within and considered a part of the control panel. In other embodiments, the gateway unit and control panel may be separate. For example, the gateway unit may be plugged into any electrical outlet in the home and receive information regarding power production from the local power source or meter via PLC. The gateway may then transmit information to the control panel, where the information may be accessible to the homeowner via a display on the panel or via a mobile device.

In some embodiments, the control panel of a local power generation system can be combined with or have the capability of also functioning as a control panel for a security system, e.g., a home security system, or an automation system. Security systems are used to protect property and for personal safety. Automation systems are typically used to improve comfort and convenience. Security systems and automation systems generally include a control panel, which controls the overall operation of the system, one or more keypads for user access to the system, and various detectors and sensors. A security system, automation system or other premises control system may include one or more peripheral sensors linked to a control panel, which may include an interface that can be used by a user. It is noted that a "control panel" may also be referred to herein as a "control unit" or "system controller." Via a control panel, a user may arm (e.g., when leaving their residence) and disarm (e.g., when entering their residence) a security system. The control panel may provide other functionality, such as a physical duress alarm, two-way voice communication, a siren, etc. Security sensors may be configured to monitor for various events. For example, a door/window sensor may be configured to detect when a door/window has been opened, a motion detector may be configured to detect motion. Other sensors may be configured to detect breaking of glass. The features and functionality of automation systems, including the control panels and peripheral devices of such systems, are well known.

In addition to a local control panel, which monitors sensor activity on premises, a security system may include a central monitoring system. For residential security systems, a remote central monitoring system can be a third party vendor's, which in some cases may be the same company that installed the alarm system. For commercial and industrial security systems, security or other personnel may monitor the premises. In commercial and industrial settings, the control panel can be integrated into a larger security system. In any event, when sensor monitoring is activated and a sensor indicates a physical disturbance, the control panel can activate an alarm. In response to an alarm, the control panel can activate an audible siren and/or send an indication of the alarm to a central monitoring entity via a security event signal. The central monitoring entity can then initiate a response, such as contacting the owner of the premises, sending security personnel, contact authorities, or a combination thereof.

Security systems may generate an alarm in response to any number of events, such as unauthorized entry, fire, a medical emergency or manual alarm activation. Further, a security system may be associated with a service that remotely monitors the status of the security system. Thus, if the security system generates an alarm, a notification signal may be transmitted via a wired and/or wireless communications link to a central station. Upon receiving the notification signal, security service personnel at the central station may attempt to contact the property owner (i.e., the party at the secured location) to verify the alarm. If it is appropriate to do so, the security service personnel may, upon confirmation of the alarm, contact an emergency response agency (e.g., the police department, the fire department or an emergency medical team, etc.). Security systems can therefore enhance the ability of homeowners and businesses to monitor their premises and to protect against break-ins and the crimes that can accompany them (e.g., theft, damage to property, assault and battery, stalking, intrusion into privacy, etc.).

FIG. 1 illustrates an embodiment of a local power generation and premises control system 100. The power portion of system 100 may also be referred to as the "power system." In this embodiment, the power system includes power production source 150 (also referred to as "power source 150"), meter 155, home electrical system 160, gateway 170, and control unit 102. Communication links 152 and 154 allow communication between power source 150, gateway 170, and control unit 102. Power is supplied from power source 150 through meter 155, where it may then connect to the home electrical system 160 for supplying power to the home. Control unit 102 is also the control unit for the premises control portion of system 100, which may also be referred to as an "alarm system." The alarm system includes sensors 101, control unit 102, monitoring system 103, and remote activation system 131. Communication links 104 (e.g., wired or wireless communication links) couple sensors 101 to control unit 102. Wired communication links can include circuit loops that are either detected as closed or open.

In the illustrated embodiment, power source 150 can generate electric power and convert it into a form useable on the premises. For example, power source 150 may include one or more solar panels (not shown) that generate DC power when exposed to the sun's rays. The solar panels may be connected to one or more inverters (not shown) that convert DC to AC, which is generally used in home electrical systems. In some embodiments, each solar panel or group of panels may have its own inverter, sometimes referred to as a "microinverter." In other embodiments, there may be one inverter that converts current supplied by all of the panels. In still more embodiments, any combination of inverters may be connected to any single solar panel or group of panels. One or more solar panels may also be configured to supply DC power to certain applications or home appliances, whether or not the DC power also passes through one or more or a portion of an inverter, meter, or other portions of the power system.

In some embodiments, AC power can be supplied from the inverters to a meter 155. Meter 155 may be an existing meter that tracks power drawn from the utility by the home, or it may be an alternative or additional meter that may, for example, be installed when a local power production source 150 is installed on or near the premises. Depending on the configuration, meter 155 can track power flowing from power source 150 to home electrical system 160. An overcurrent protection device, breaker, or any other monitoring, safety, or other device (not shown) may be present between meter 155 and home electrical system 160 or at any other suitable location in the circuit.

In the embodiment illustrated in FIG. 1, gateway 170 is in communication with power source 150 via communication link 152. Communication link 152 can be, for example, a wired or wireless link, including power line communication, wireless transmitter, or any other suitable communication method. Gateway 170 can receive information from power source 150 that includes, for example, information about gross production of power by power source 150 or individual portions thereof, operating information (e.g., temperature), messages or data relating to errors, maintenance, or administrative matters, or any other suitable information generated by power source 150. Gateway 170 can also receive power from power source 150 or receive power or information from other sources as well. For example, gateway 170 can receive information regarding net power usage by the home from the home's utility meter, which may be a net meter, one-way meter, or a meter that may be operated in either mode. In some embodiments, current transformer (CT) clamps may be installed on an existing meter and send signals wired or wirelessly to gateway 170 or any other component (e.g., power production source 150, meter 155, or control unit 102) regarding net usage of power by the home. In other embodiments, the utility meter may have the capability of or be modified to have the capability of communicating with gateway 170 or another component of system 100 to provide energy usage data. Gateway 170 may also be in communication with meter 155. Any of the various components of system 100 may be in communication with other components via a communication link to transmit or receive various data depending on where the data is desired to be processed, evaluated, manipulated, displayed, otherwise used, etc. These communications links may be direct or indirect, wired or wireless, and can include for example wifi or Ethernet, or based on any number of standards, e.g., IP based, 433 MHz, 900 MHz, Z-wave, ZIGBEE, Bluetooth, etc. For example, both gateway 170 and meter 155 can send information wirelessly to control unit 102, whether or not gateway 170 and meter 155 may also establish a communication link between themselves. The various components of system 100 may also communicate via intermediary nodes, which may be dedicated communication nodes or incorporated into another component of system 100. One possible intermediary node is a home communication network. For example, gateway 170 may send data or information to a home computer connected to a home computer network, which may or may not have a communication link with control unit 102. The home computer (not shown in FIG. 1) may then transmit data or information from gateway 170 to control unit 102, before or after manipulation or evaluation of the data or information by the home computer, or to another device or the internet or mobile cloud via the home network. As another example, CT clamps on the utility meter or a separate meter associated only with the local power production system may send gross or net energy consumption information via a 433 MHz wireless hop to a plug-in bridge device (not shown), and then by Z-wave from the bridge to control unit 102. Alternatively or in addition, one or more electrical meters may be a smart meter that can communicate directly with control unit 102 via a ZIGBEE plug-in or other communication device or standard.

In some embodiments, all information communicated to or generated at control unit 102 (or other component connected to system 100) may be communicated directly or indirectly to other devices such as a mobile phone or to a separate service or back-end partner that provides alerts or information via a mobile phone application or the like. Control unit 102 or, for example, a mobile phone or home computer, could also be used by a homeowner to control the power system by, for example, making configuration changes to microinverters. Gateway 170, control unit 102, or other processors may also be configured to automatically monitor power production or other functions and be programmed to make configuration changes with or without user input, and whether or not an alert is sent to a display. In some embodiments, technicians may also be able to obtain data for troubleshooting or evaluating performance. This data may be accessible either locally from control unit 102 (or other component connected to system 100) or remotely via, for example, a data feed from the home network to the internet or to a cloud network. Control unit 102 may also be able to provide software or firmware upgrades or updates to gateway 170 or other components of system 100. Other components of system 100 that are capable of receiving software updates from an outside provider via the internet or direct upload (for example, from a home computer or USB stick) may also be used to provide software updates to the entire system 100.

The gateway unit can configured to transmit a troubleshooting signal to the control unit that is useful for indicating whether a portion of the power production source is underproducing. In some examples, the troubleshooting signal production signal is a production signal. The gateway unit may receive a production signal from more than one inverter and compare the production signal received from a first inverter to the production signal received from a second inverter to generate the troubleshooting signal.

In some embodiments, gateway 170 can have processors that manipulate or evaluate data received from power source 150, meter 155, or other devices that are part of system 100 (or able to connect to it via a communication link). For example, gateway 170 can obtain data signals from each of the microinverters associated with one or more solar panels. Gateway 170 may then multiplex or add the data to provide solar panel gross production data to control unit 102. Gateway 170 may also be programmed to compare signals from one or more microinverters to signals from other microinverters and determine that there is a malfunction with a solar panel or other component. Gateway 170 may also compare received data to historical or projected information regarding power production, which may also take into account historical, current, or projected weather patterns or sunlight, to troubleshoot problems with solar panels, including potential interference or shading from, for example, tree branches. Gateway 170 may transmit data to control unit 102 for further processing or evaluation, or may, for example, directly transmit a signal that causes a visual or audible alert at control unit 102 or a mobile device. Such an alert may require some particular action or may be, for example, simply in response to a programmed request from the user or homeowner for a periodic alert regarding power production information. It is to be appreciated that processing of data or information may be performed at any one or more of the various processors that may be present in or added to one of the components of system 100 or otherwise connected to or in communication with system 100, e.g., a home computer, mobile phone, or service provider processors accessing data that has been uploaded to a cloud network or the internet.

The alarm system shown in FIG. 1 will now be described in greater detail. As noted above, the alarm system includes sensors 101, control unit 102, monitoring system 103, and remote activation system 131. Communication links 104 (e.g., wired or wireless communication links) couple sensors 101 to control unit 102. Wired communication links can include circuit loops that are either detected as closed or open. In some embodiments, sensors 101 and control unit 102 are located on the same premises, such as in the same residence or in the same building. Communication link 106 (e.g., a wired telephone connection, wired or wireless network connection, cellular connection, etc., or combination thereof) couples control unit 102 to monitoring system 103.

Generally, sensors 101 include any of a variety of different types of sensors, such as door and window sensors, motion sensors, glass break sensors (e.g., detecting a physical break or detecting the sound of a glass break), etc. Generally, control unit 102 is configured to monitor sensors 101 for alarm conditions via communication links 104 and relay alarms to monitoring system 103 via communication link 106.

Control unit 102 includes sensor monitoring module 111, user interface 112, alarm module 113, and power module 110. Sensor monitoring module 111 is configured to monitor sensors 101. Sensors 101 can sense and/or indicate a change in their physical surroundings (e.g., a normally closed connection becomes open, a signal indicating that the sound of breaking glass was detected, etc.), which may be indicative of an unauthorized access, on communication links 104. For example, a circuit connected to a door sensor can transition from closed to open (or at least to a resistance exceeding a pre-determined resistance threshold) indicating that a door has been opened. A motion sensor can send an electrical signal indicative of detected motion. Sensor monitoring module 111 may monitor communication links 104 for indications and signals sent from sensors 101. Upon sensor monitoring module 111 receiving an indication or signal of a change in physical surroundings, sensor monitoring module 111 may send the indication or signal to alarm module 113. When appropriate, alarm module 113 can treat a monitored indication or signal from a sensor as an alarm condition.

User interface 112 can include an input interface and an output interface. The input interface can comprise a physical input interface or virtual input interface that includes one or more key pads (e.g., a numeric keypad for entering a disarm code, a touch screen alphanumeric keypad, etc.), sensor activation buttons, physical duress buttons, etc. The input interface can also include a condenser for receiving audio input and/or communicating with monitoring system 103. The output interface includes an output display device that can display system status, such as armed, disarmed, sensors/zones that have detected change in physical surroundings, etc. The output interface can also include a speaker that audibly outputs information similar to that displayed on the output display device. The speaker can also be used by monitoring system 103 to communicate with a user of control unit 102.

Power module 110 can include data ports or processors for receiving or processing information regarding the power system of system 100. For example, as shown in FIG. 1, power module 110 may receive information from gateway 170 via communication link 154. Such information may then be manipulated or translated into graphical or textual form, for example, or generate an alert, any of which may then be sent to user interface 112 for display or audible alert. User interface 112 may also receive input from the user by, for example, a key pad, which then is communicated to power module 110 for communication to other components of system 100 for configuration of the power system. Power module 110 may also comprise memory for storing applications or information, and may include its own processors or transceivers or rely on those located in other portions of the control unit 102.

Figure 2:
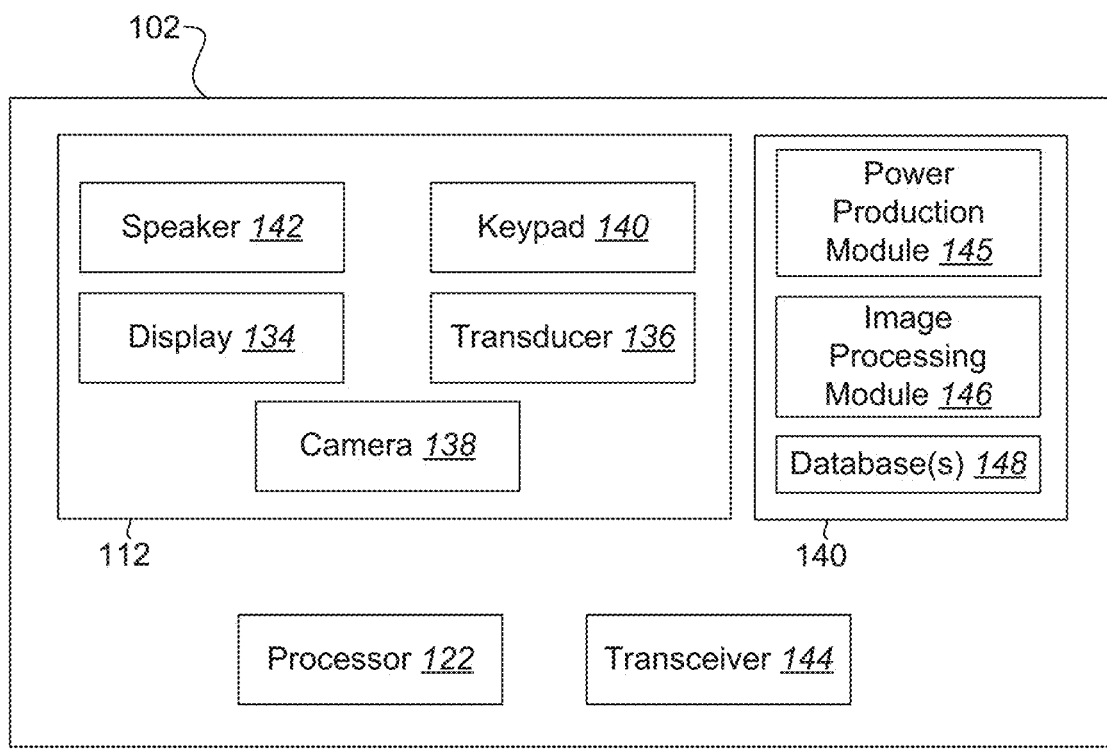
FIG. 2 is a block diagram of an embodiment of a control unit of a premises control and power generation system.

FIG. 2 is a block diagram of control unit 102, according to an embodiment of the present invention. Control unit 102 includes a processor 122, memory 140, and user interface 112. User interface 112 includes various input/output (I/O) devices, such as a display 134, which may comprise a touch screen, a transducer 136, a camera 138, a keypad 140, and a speaker 142. Control unit 102 may further include a transceiver 144 for receiving and transmitting data (e.g., video, audio, images, data) over a network. It is noted that a "communication interface" as referred to herein may comprise transceiver 144 and user interface 112. In some embodiments, control unit 102 may be disposed entirely within a housing. In other embodiments, one or more components may be disposed at least partially outside the housing. For example, a USB device that comprises a wireless communication router or similar device may be plugged into a USB port of control unit 102 to allow communication with another device.

Generally, control unit 102 may operate under control of an operating system stored in memory 140, and interface with a user to accept inputs and commands and to present outputs through user interface 112. Control unit 102 may also implement a compiler (not shown) which allows one or more application programs (not shown) written in a programming language to be translated into processor 122 readable code. In one embodiment, instructions implementing an application program may be tangibly embodied in a computer-readable medium. Further, an application program may include instructions which, when read and executed by processor 122, may cause processor 122 to perform the steps necessary to implement and/or use embodiments of the present disclosure. It is noted that an application program and/or operating instructions may also be tangibly embodied in memory 140 and/or data communications devices, thereby making a computer program product or article of manufacture according to an embodiment the present disclosure. As such, the term "application program" as used herein is intended to encompass a computer program accessible from any computer readable device or media. Furthermore, portions of the application program may be distributed such that some of the application program may be included on a computer readable media within controller 102, and some of the application program may be included in a remote device, such as a remote computer.

According to one embodiment, display 134 may be configured to display information, such as, for example only, video, images, text, or a combination thereof. In addition, camera 138 may be configured to capture video and still images. Further, transducer 136, which may comprise a microphone, may be configured to receive an audio input and convert the audio input into an electrical signal for transmission. Speaker 142 may be configured to convey an audio output.

Memory 140 may include a power production module 145 and an image processing module 146, each of which may comprise hardware, software, firmware, or a combination thereof. Memory 140 may also include one or more databases 148 for storing data. In FIG. 2, power production module 145 and image processing module 146 are illustrated as being stored in memory 140 so as to be accessible and/or executable by processor 122. However, it should be understood that power production module 145 and image processing module 146 may be otherwise stored, even remotely.

In some embodiments, power production module 145 can include instructions for processing information received from power production system components, such as, for example only, power production source 150, gateway 170, or meter 155 (see FIG. 1). Power production module 145 can also include instructions for processing inputs received from user interface 112 relating to the power production system. Data related to power production or for example, historical or projected power production, weather, or sunlight information may also be stored in power production module 145 or database(s) 148.

Figure 3:
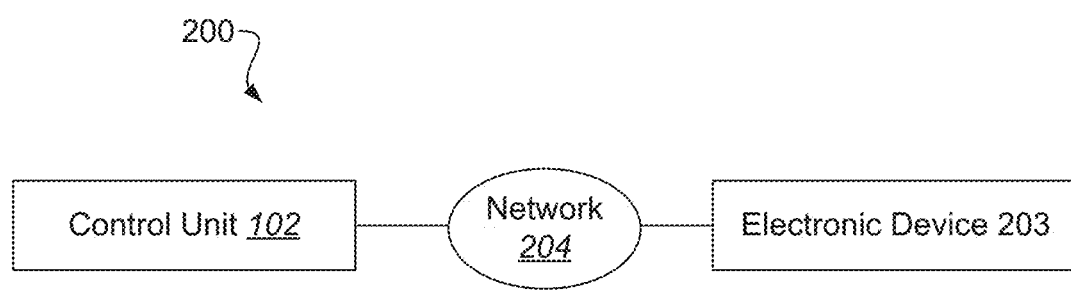
FIG. 3 illustrates a control unit of a power production system communicatively coupled to an electronic device via a network, according to an embodiment of the present disclosure.

A system 200, in accordance with an embodiment of the present invention, is illustrated in FIG. 3. System 200 comprises control unit 102 communicatively coupled to an electronic device 203 via a communication network 204. Accordingly, as will be understood by a person having ordinary skill in the art, control unit 102 may be configured to transmit and receive video and audio content (e.g., a live video feed and/or a video message or still image) or other data or information to and from electronic device 203 via communications network 204. Communications network 204 may comprise any suitable network that enables data transmission between two or more electronic devices. For example, network 204 may comprise a local area network or a wide area network. Furthermore, it is noted that network 204 may comprise a wireless network, a wired network, or a combination thereof. Although system 200 is illustrated as only two communicatively coupled devices, the present invention is not so limited. Rather, control unit 102 may be communicatively coupled to any number of electronic devices via communication network 204.

According to one embodiment, electronic device 203 may include gateway 170. In other embodiments, electronic device 203 may include a light sensor configured to measure the amount of sunlight directed towards one or more solar panels in a power production system. The light sensor may then transmit data through network 204 to control unit 102 or gateway 170 to compare projected power generation under the observed conditions to actual gross power production information generated by the system. A malfunction of one or more components may be indicated if projected power generation does not match actual production within a desired range. In some embodiments, electronic device 203 may be a camera that provides a visual indication of the state of different portions of a power production system, such as the condition of solar panels or air space between solar panels and the sun.

Figure 4:
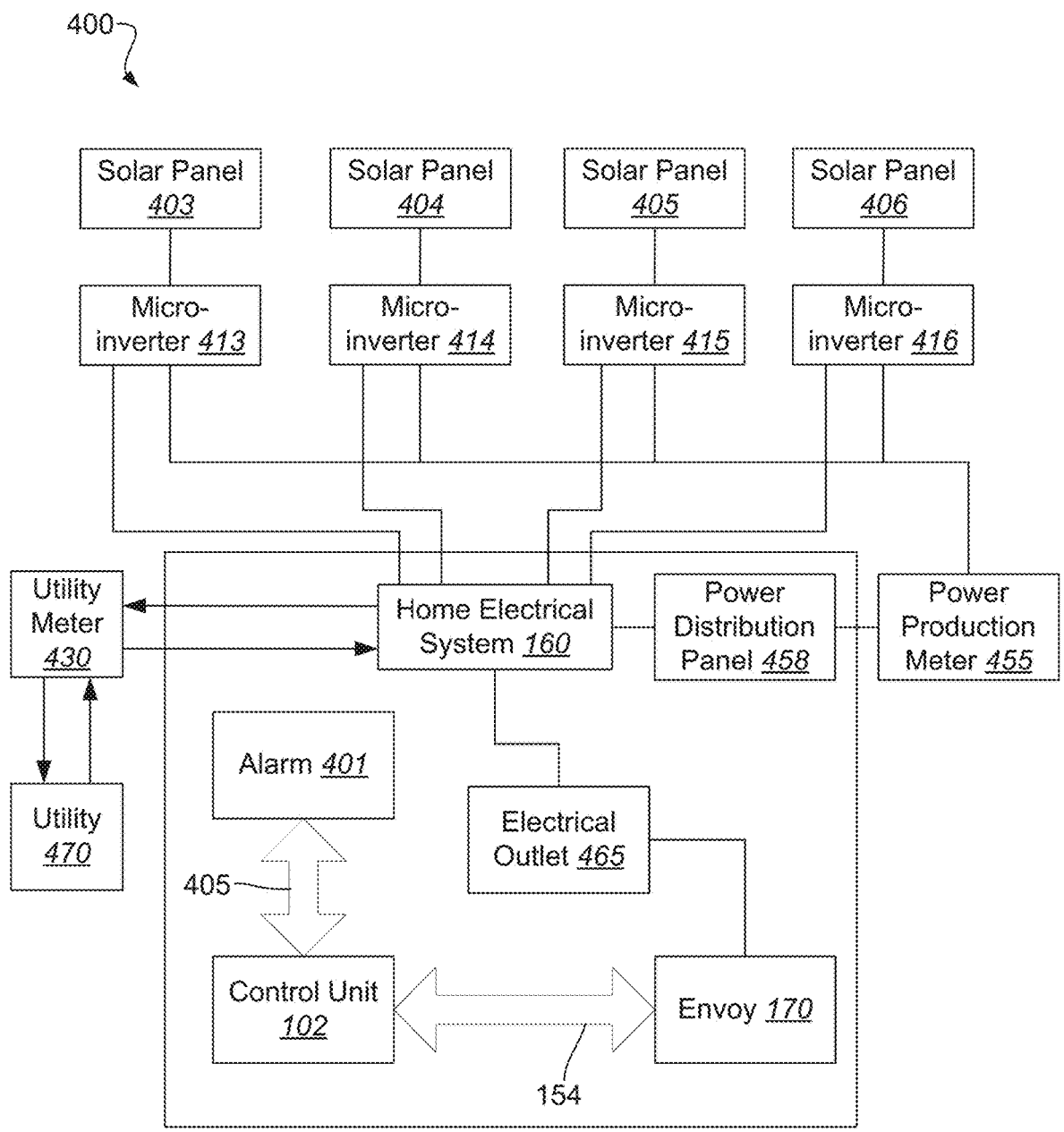
FIG. 4 depicts an embodiment of a premises control and power production system, according to an embodiment of the present disclosure.

FIG. 4 illustrates another embodiment of a power generation and premises control system 400. System 400 includes solar panels 403, 404, 405, and 406, which generate DC power when exposed to sunlight. Microinverters 413, 414, 415, 416 receive direct current from solar panels 403, 404, 405, 406 respectively and convert the DC power into alternating current. The AC power is then directed to power production meter 455 where it is measured. Power production meter 455 sends power to power distribution panel 458 and then to home electrical system 160 for use by home appliances, etc.

In the embodiment illustrated in FIG. 4, microinverters 413, 414, 415, 416 can also send signals to home electrical system 160 regarding electricity produced by solar panels 403, 404, 405, 406 or converted by microinverters 413, 414, 415, 416, or other data or information. The signals from microinverters 413, 414, 415, 416 are accessible from electrical outlet 465, which can be part of home electrical system 160, via power line communication. Gateway 170 can be plugged into electrical outlet 465 and receive data regarding power production by solar panels 403, 404, 405, 406, power conversion by microinverters 413, 414, 415, 416, or other data or information. Control unit 102 can receive data or information from gateway 170 regarding power production or conditions of the power generation system via communication link 154, which may be wired or wireless. Control unit 102 also serves as the control unit for alarm system 401, which includes any aspects of the alarm system (as described, for example, in connection with FIG. 1) other than control unit 102, and communication with alarm system 401 and control unit 102 can be through communication links 405, which may be wired or wireless.

In the embodiment illustrated in FIG. 4, the alarm system 401, control unit 102, home electrical system 160, electrical outlet 465, gateway 170, and power distribution panel 458 may be located primarily inside home 420. System 400 can be configured such that energy needs of home 420 can be supplied first by power being produced by solar panels 403, 404, 405, 406 rather than from the utility 470. When the electrical load on home electrical system 160 exceeds power being produced by the solar panels as measured at power production meter 455, additional power may be supplied from the utility 470 through utility meter 430. When the electrical load on home electrical system 160 is less than power being produced by the solar panels as measured at power production meter 455, the excess power being produced locally can flow back to the utility 470 through utility meter 430. Alternatively, some or all of the excess power may be stored for later use.

Figure 5:
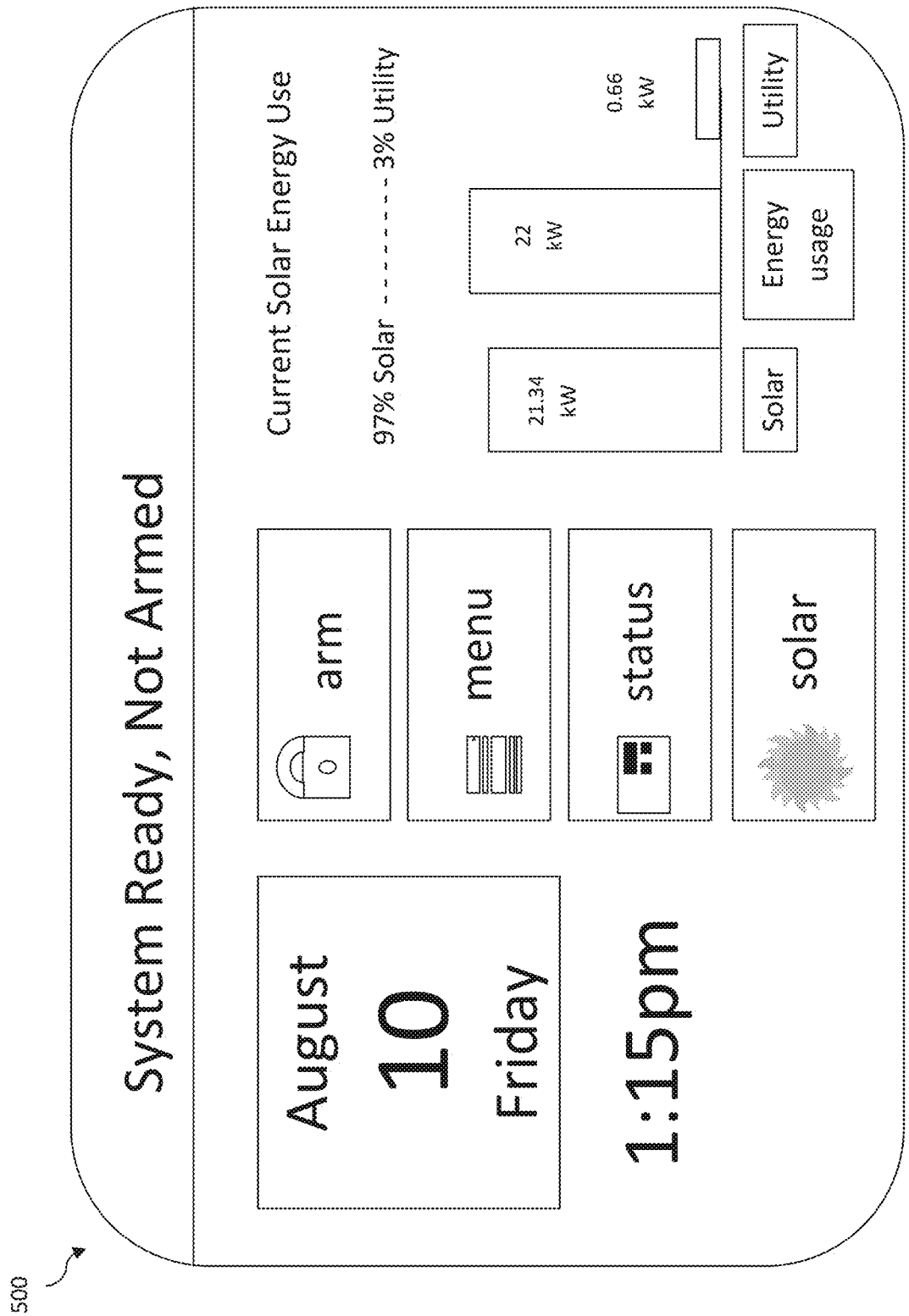
FIG. 5 depicts an example screen shot of a control unit of a premises control and power production, in accordance with an embodiment of the present disclosure.

FIG. 5 is an example screen shot 500 of a display, e.g. display 134 shown in FIG. 2, of an embodiment of control unit 102 (see FIGS. 1-4). In screen shot 500, the top of the screen gives an alarm status of "System Ready, Not Armed." Directly below this status message is a column showing date and time information and another column with touch screen buttons to select different functions such as "arm," "menu," "status," or "solar." Each of these buttons performs different functions, e.g., arms the alarm system or presents the user with a new menu screen or status messages or reports. The far right area of screen shot 500 shows a sample "Current Solar Energy Use" snapshot that reports on current home energy use and the extent to which energy is being supplied by local solar panels versus the utility. It can be advantageous for a homeowner or user to view in one screen on a control panel status and alert information related to the premises control system, local power production (e.g., by solar panels), and other functions that may be controlled by the control panel, such as home automation. Information, data, and signals for these various functions may be received from, for example, various components of the system 100 shown in FIG. 1, for example, monitoring system 103, remote activation system 131, gateway 170, and more. The processing and storing of data and information may be separated into different modules within control unit 102 or elsewhere, or may be combined within the same memory or processing modules to some extent. Screen shot 500 shows how information relating to these different functions can be presented simultaneously in one convenient location for the user. Control unit 102 may be customized by the user to present a custom home screen or custom reports relating to each of these various functions, e.g., security, power production, home automation, etc.

Figure 6:
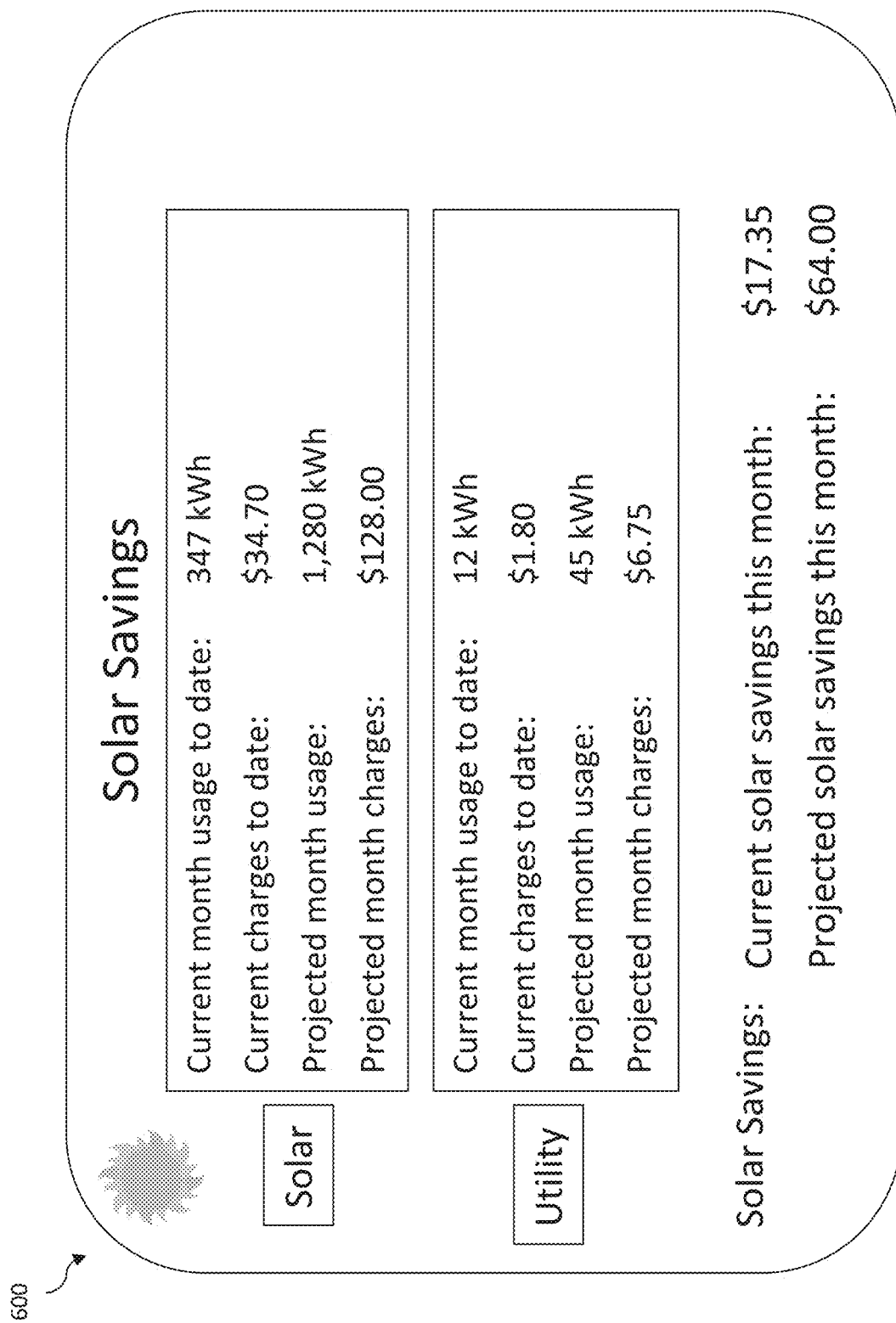
FIG. 6 depicts another example screen shot of a control unit of a premises control and power production system, in accordance with an embodiment of the present disclosure.

FIG. 6 is another example screen shot 600 of a display, e.g. display 134 shown in FIG. 2, of an embodiment of control unit 102 (see FIGS. 1-4). FIG. 6 shows information relating to current monthly "Solar Savings," and can be called the Solar Savings report. This report may be accessed by selecting the "Solar" button shown in screen shot 500 (FIG. 5), which could present a new menu relating to solar reports or configuration options. In some embodiments, the homeowner may enter into a power purchase agreement with a "solar company," which can supply the solar panels or equipment at little or no upfront cost to the homeowner. The power purchase agreement can set a rate at which power will be purchased from the solar company, the rate being discounted from the standard utility rate for the homeowner. The rate or rates stated in the power purchase agreement can be input by the user, but could also be sent to control unit 102 via the internet or some other communication link. In the example Solar Savings report, the current month usage of solar power is displayed along with the current charges according to the power purchase agreement, which can be stored in the memory of control unit 102. Based on the date, time, energy usage to date, or historical or other data or information, control unit 102 can also calculate and display a projected production or usage of solar power for the entire month or other period, along with the projected cost. The current usage of power from the utility may also be displayed, along with cost and projected usage or cost for the month or other period. As shown in screen shot 600 of FIG. 6, "Solar Savings" can also be calculated and displayed by control unit 102, which shows the savings to date for purchasing power at a discounted rate from the solar company as well as the projected savings for the current month or other time period. Any other data or information generated by control unit 102 or sent to control unit 102 from, for example, gateway 170, power production meter 155, solar panels 403, 404, 405, 406, microinverters 413, 414, 415, 416, utility meter 430, or any other component of a power production or alarm system can be processed or displayed by control unit 102 in default reports or customized reports created by a user or technician.

In other embodiments, other power purchasing arrangements can be made with a solar company or utility. For example, the solar company or homeowner may negotiate to receive compensation or a direct cancellation credit from the utility for any power supplied to the grid from the local power production system. Control unit 102 can be used to control the extent to which home energy usage is supplied by the local power production source, e.g., solar panels 403, 404, 405, 406 shown in FIG. 4, or the utility. Control unit 102 can also be used to control the extent to which excess power from the local power production source, e.g., when power usage is less than power being produced, is either supplied to the utility grid, stored locally (with batteries, for example), or put to another use (for example, sent to a nearby premises).

Figure 7:
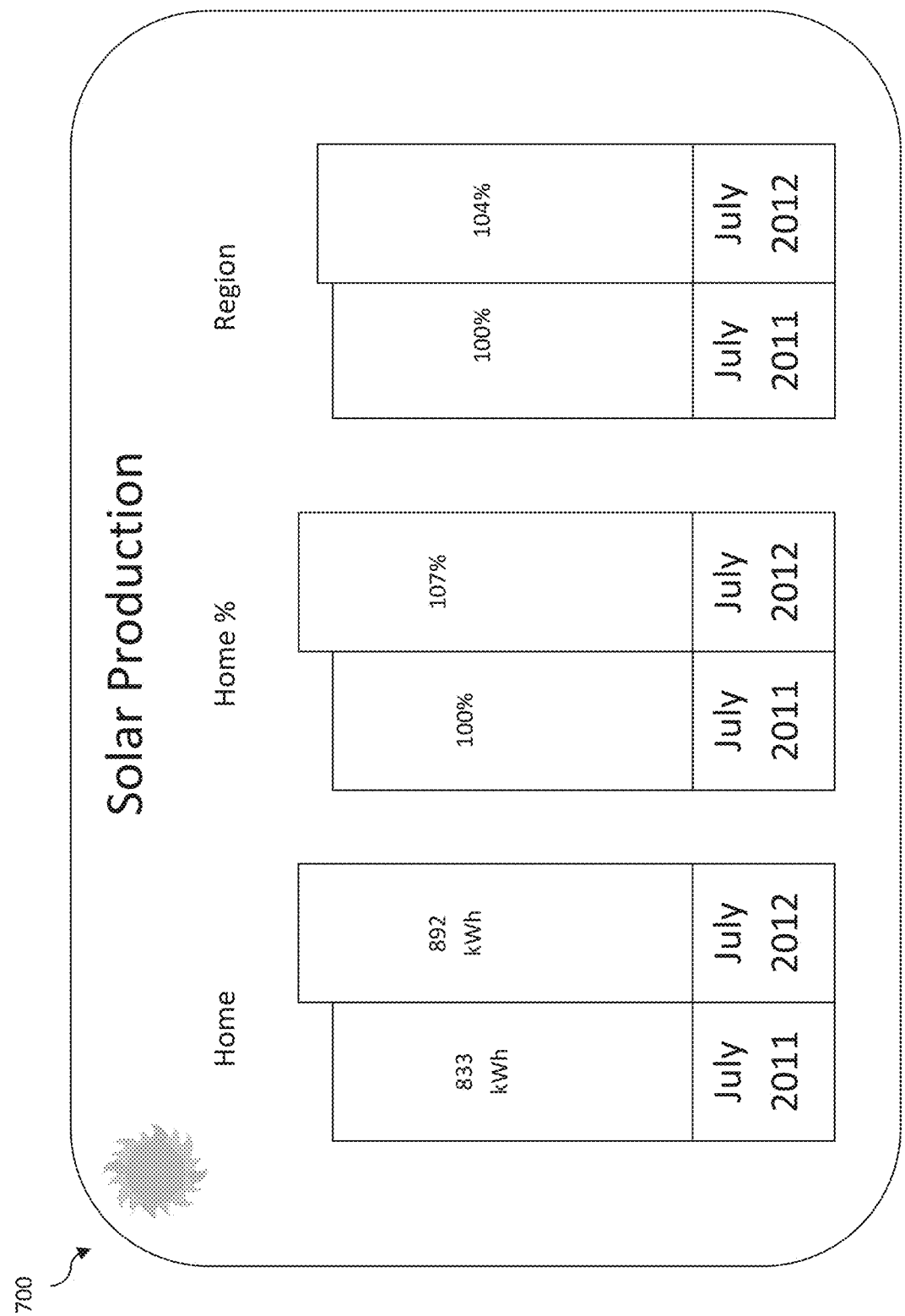
FIG. 7 depicts another example screen shot of a control unit of a premises control and power production system, in accordance with an embodiment of the present disclosure.

FIG. 7 is another example screen shot 700 of a display, e.g. display 134 shown in FIG. 2, of an embodiment of control unit 102 (see FIGS. 1-4). Screen shot 700 is an example snapshot of a historical report showing how solar production in the home for a particular month compared to a previous month and how solar production varied regionally in those two months. It is to be appreciated that the type of information displayed or comparisons performed can be varied, for example, with respect to time periods evaluated or geographical scope of benchmarks or theoretical benchmarks, e.g., estimated power production goals based on daily sunlight or weather patterns.

It is to be appreciated that reports or displays other than those shown as examples in FIGS. 5-7 can be created or displayed by control unit 102, and information relating to an alarm system, power production, home automation, or other functions may be displayed separately from or simultaneous with other information. For example, the display of control unit 102 may alternate every few seconds between information relating to an alarm system and information relating to power production. In addition to displaying information, control of one or more of the alarm system, power production systems, and home automation systems may be accomplished with control unit 102. For example, using the various menus and key pad or voice input, control unit 102 may be used to control various home appliances to maintain energy use at or below the level of local energy production. Control unit 102 may perform this function automatically when put in a particular mode of operation. By default or user command, control unit 102 may also supply various alerts or messages either on screen, with an audible alert, or through another device such as a mobile phone. For example, alerts relating to operation or malfunctions of the local power production system may also be supplied to the user or a separate monitoring service provider. If one or more solar panels is not operating properly, control unit 102 may be commanded to or automatically shut down one or more portions of the local power production system until it can be evaluated and serviced. Data kept by the control unit 102, gateway 170, or other system components can aid in evaluating or servicing the power production system. As another example, if a certain threshold amount of power has been supplied from the utility rather than at a discounted rate from solar panels, an alert may be sent to the homeowner's mobile phone for information purposes or so that energy use may be altered to optimize use of solar-generated power. The mobile phone or control unit 102 may also be used to supply certain commands such as altering operation of the power production system or home power use via a home automation system.

In some embodiments, providing for a communication link between gateway 170 and control unit 102 (see FIGS. 1, 4) provides not only increased convenience for a user to view information relating to multiple functions (e.g., home security, automation and power production) on one panel, but can also decrease cost. Gateway 170 need not be configured to communicate with other system components or networks (e.g., the internet) if it can communicate with control unit 102, which can provide a communication bridge to other networks if necessary.

Figure 8:
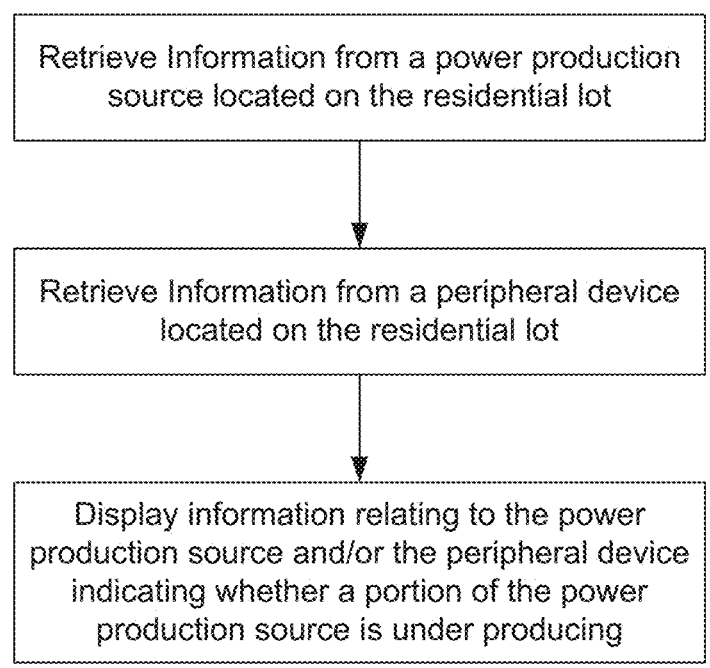
FIG. 8 is a block diagram of an example of a method of monitoring solar power production, in accordance with an embodiment of the present disclosure.

FIG. 8 is a block diagram of a method 800 for monitoring a production level. In this example, the method 800 includes retrieving 802 information from a power production source location on a residential lot, retrieving 804 information from a peripheral device located on the residential lot, and displaying 806 information relating to the power production source and/or the peripheral device indicating whether a portion of the power production source is under producing.

Reference throughout this specification to "some embodiments" or an "embodiment" means that a particular feature, structure or characteristic described in connection with the embodiment is included in at least some embodiments. Thus, appearances of the phrases "in some embodiments" or similar phrases referring to an "embodiment" in various places throughout this specification are not necessarily all referring to the same embodiment and may refer to one or more of the same or different embodiments. Furthermore, the particular features, structures or characteristics may be combined in any suitable manner, as would be apparent to one of ordinary skill in the art from this disclosure, in one or more embodiments.

As used in this application, the terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Similarly, it should be appreciated that in the above description of embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that any claim require more features than are expressly recited in that claim. Rather, inventive aspects lie in a combination of fewer than all features of any single foregoing disclosed embodiment.

Although described in the illustrative context of certain preferred embodiments and examples, it will be understood by those skilled in the art that the disclosure extends beyond the specifically described embodiments to other alternative embodiments and/or uses and obvious modifications and equivalents. For example, the foregoing description contains many specifics that should not be construed as limiting the scope of the invention or of any of the appended claims, but merely as providing information pertinent to some specific embodiments that may fall within the scopes of the invention and the appended claims. Features from different embodiments may be employed in combination. In addition, other embodiments of the invention may also be devised which lie within the scopes of the invention and the appended claims. The scope of the invention is, therefore, indicated and limited only by the appended claims and their legal equivalents. All additions, deletions and modifications to the invention, as disclosed herein, that fall within the meaning and scopes of the claims are to be embraced by the claims.

What is claimed is:

1. A premises control system, comprising:
a power production source communicatively coupled to a power production meter, the power production source being configured to supply power to an electrical system of a first premises;
a utility grid communicatively coupled to the electrical system, the utility grid being communicatively coupled to a utility meter;
a gateway unit communicatively coupled to the power production source and the utility meter; and
a control unit communicatively coupled to the premises control system, the control unit being configured to display a status of the premises control system, display the information regarding power production by the power production source, and receive inputs from a user;
wherein the power production meter is configured to:
obtain information regarding power production by the power production source;
wherein the gateway unit is configured to:
receive information associated with a current power usage by the electrical system;

determine that excess power is produced by the power production source based at least in part on a difference between the power produced by the power production source and the current power usage by the electrical system;

and wherein the utility meter is configured to:
initiate a flow of the excess power to a second electrical system of a second premises different than the first premises based at least in part on determining that the excess power is produced and receiving an input from the user at the control unit indicating the flow of the excess power to the second electrical system.

2. The premises control system of claim 1, wherein the electrical system is configured to determine an electrical load and the gateway unit is configured to determine the excess power based at least in part on the electrical load being less than the power production by the power production source.

3. The premises control system of claim 1, further comprising one or more inverters that are communicatively coupled to the power production source.

4. The premises control system of claim 1, further comprising a plurality of appliances, wherein the plurality of appliances are communicatively coupled to the control unit, and wherein the control unit is configured to adjust respective energy usage of each of the plurality of appliances to maintain energy usage at the power production by the power production source.

5. The premises control system of claim 1, wherein the gateway unit is configured to receive information regarding power production by the power production source and transmit a troubleshooting signal to the control unit indicating whether a portion of the power production source is under-producing.

6. The premises control system of claim 5, wherein the gateway unit is configured to:
receive a production signal from each of a first inverter and a second inverter; and
compare the production signal received from the first inverter to the production signal received from the second inverter; and
generate the troubleshooting signal based at least in part on the comparison.

7. The premises control system of claim 1, the control unit comprising a communication interface, the communication interface including a display device, a speaker, and a microphone, wherein the control unit is wirelessly coupled to the premises control system and the gateway unit.

8. The premises control system of claim 1, wherein the control unit is configured to display one or more of a current amount of power produced by the power production source, a historical amount of power produced by the power production source, a projected amount of power estimated for future production by the power production source, a cost of the power produced by the power production source, an amount of power used from the power produced by the power production source, an amount of power supplied from or supplied to the utility grid, or a comparison of power produced by the power production source to power produced in a different location or time period, or a combination thereof.

9. The premises control system of claim 1, wherein the utility meter is further configured to:
initiate the flow of a portion of the excess power to a storage device based at least in part on determining that the excess power is produced and receiving an input from the user at the control unit indicating the flow of the excess power to the storage device.

10. The premises control system of claim 1, wherein the utility meter is further configured to:
initiate the flow of the excess power to the utility grid based at least in part on determining that the excess power is produced and receiving an input from the user at the control unit indicating the flow of the excess power to the utility grid.

11. The premises control system of claim 1, further comprising:
an alarm system communicatively coupled to the premises control system and the control unit;
wherein the control unit is further configured to arm or disarm the alarm system.

12. The premises control system of claim 1, wherein the gateway unit is further configured to:
send information to a second device different from the control unit based at least in part on receiving information associated with the current power usage by the electrical system and receiving an input from the user at the control unit identifying the second device to send the information to.

13. The premises control system of claim 12, wherein the second device is further configured to:
display a status of the premises control system, display the information regarding power production by the power production source, and receive inputs from the user.

14. The premises control system of claim 12, wherein the second device is further configured to make configuration changes to the power production source.

15. A premises control system control unit, comprising:
a housing;
a display disposed within the housing and viewable from without the housing;
a processor disposed within the housing;
a user interface that is configurable to receive inputs from a user; and
a memory module disposed within the housing;
wherein the premises control system control unit communicatively coupled with one or more of a utility grid, a power production source, a gateway unit, and a control unit;
the power production source being coupled to a power production meter, the power production source being configured to supply power to an electrical system of a first premises;
the utility grid communicatively coupled to the electrical system, the utility grid being coupled to a utility meter;
the gateway unit communicatively coupled to the power production source and the utility meter; and
wherein the power production meter is configured to:
obtain information regarding power production by the power production source;
wherein the gateway unit is configured to:
receive information associated with a current power usage by the electrical system;
determine that excess power is produced by the power production source based at least in part on a difference between the power produced by the power production source and the current power usage by the electrical system;
and wherein the utility meter configured to:
initiate flow of the excess power to a second electrical system of a second premises different than the first premises based at least in part on determining that the excess power is produced and receiving an input from the user at the control unit indicating a flow of the excess power to the second electrical system.

16. The premises control system control unit of claim 15, wherein the electrical system is configured to determine an electrical load and the gateway unit is configured to determine the excess power based at least in part on the electrical load being less than the power production by the power production source.

17. The premises control system control unit of claim 15, further comprising one or more inverters that are communicatively coupled to the power production source.

18. A method of monitoring solar power production on a residential lot of a first premises, comprising:

obtaining, by a power production meter, information regarding power production by a power production source;

displaying a status of a first premises control system and the information regarding power production by the power production source;

receiving inputs from a user;

receiving information associated with a current power usage by an electrical system;

determining that excess power is produced by the power production source based at least in part on a difference between the power produced by the power production source and the current power usage by the electrical system; and initiating, by a utility meter, a flow of the excess power to a second electrical system of a second premises different than the first premises control system based at least in part on determining that the excess power is produced and receiving an input from the user at a control unit indicating the flow of the excess power to the second electrical system.

\* \* \* \* \*